(12) United States Patent
Stieglitz et al.

(10) Patent No.: US 7,477,747 B2
(45) Date of Patent: Jan. 13, 2009

(54) METHOD AND SYSTEM FOR INTER-SUBNET PRE-AUTHENTICATION

(75) Inventors: Jeremy Stieglitz, Menlo Park, CA (US); Nancy Cam Winget, Mountain View, CA (US)

(73) Assignee: Cisco Technology, Inc.

( * ) Notice: Subject to any disclaimer, the term of this patent is extended or adjusted under 35 U.S.C. 154(b) by 820 days.

(21) Appl. No.: 11/051,394

(22) Filed: Feb. 4, 2005

(65) Prior Publication Data

US 2006/0179307 A1 Aug. 10, 2006

(51) Int. Cl.
*H04L 9/12* (2006.01)
(52) U.S. Cl. .................... 380/270; 380/247; 726/3; 713/168
(58) Field of Classification Search .......... 713/157; 380/247
See application file for complete search history.

(56) References Cited

U.S. PATENT DOCUMENTS 6,834,341 B1 * 12/2004 Bahl et al. .......... 713/156
7,236,477 B2 * 6/2007 Emeott et al. .......... 370/331
2004/0098586 A1 * 5/2004 Rebo et al. .......... 713/169
2004/0168054 A1 8/2004 Halasz et al.
2004/0218580 A1 * 11/2004 Bahl et al. .......... 370/350
2005/0163078 A1 * 7/2005 Oba et al. .......... 370/331

OTHER PUBLICATIONS

Bargh et al, Fast Authentication Methods for Handovers between IEEE 802.11 Wireless LANs, Oct. 2004,ACM,pp. 51-60.*
David Halasz, "IEEE 802.11i and wireless security", http://www.embedded.com/showArticle.jhtml?articleID=34400002, Aug. 25, 2004.

* cited by examiner

*Primary Examiner*—Matthew B Smithers
(74) *Attorney, Agent, or Firm*—Tucker Ellis & West LLP

(57) ABSTRACT

A method and system for performing pre-authentication across inter-subnets. A pre-authentication request is received by a first access point associated with a first subnet from a mobile node requesting that is requesting pre-authentication with a second access point associated with a second subnet. The request is forwarded by the access point to a first authenticator that is the authenticator for the first subnet. The first authenticator obtains from a root infrastructure node the address for a second authenticator that is the authenticator for the second access point. The first authenticator then pre-authenticates the mobile node with the second authenticator by sending a message to the address for the second authenticator.

21 Claims, 3 Drawing Sheets

METHOD AND SYSTEM FOR INTER-SUBNET PRE-AUTHENTICATION

BACKGROUND OF THE INVENTION

The present invention relates generally to wireless local area networks (WLAN) and in particular to a method and system for pre-authenticating a wireless station on a different subnet.

The Institute of Electrical and Electronics Engineers (IEEE) 802.11i standard for Medium Access Control (MAC) Security enhancements includes an optional phase for wireless station pre-authentication. Pre-authentication is designed to allow a supplicant to establish security associations with multiple access points (AP) preceding a direct association to those APs in order to improve the performance of fast (re)-association in a mobile environment. Pre-authentication can be a useful performance enhancement, as now roaming associations will not include the full protocol overhead of a full re-authentication of the supplicant.

Per the 802.11i standard, pre-authentication uses the IEEE 802.1X protocol and state machines with EtherType 88-C7. To effect pre-authentication, the wireless station's (STA's) Supplicant sends an IEEE 802.1X EAPOL-Start (Extensible Authentication Protocol Over Lan) message with the Destination Address (DA) being the Basic Service Set Identification (BSSID) of the targeted AP and the Return Address (RA) being the BSSID of the AP with which the Supplicant is associated. The target AP uses a BSSID equal to the radio MAC address of its authenticator.

In order to generate these pre-authentication requests, a mobile node (MN) or wireless station (STA) will use the radio MAC address of the potential APs that the MN may roam to, as the identifier of APs for pre-authentication. A problem with this approach is that there may exist situations where there are APs that a supplicant can pre-authenticate to that are not in the same subnet. Thus, although the pre-authentication standard allows for supplicants to pre-authenticate to all access points they can "see" (receive beacons from), the access point and/or infrastructure that is associated with that station may not know how to locate, find, or route to access point radio MAC address(es) that are not in the same local subnet. Thus, the need exists for a method for enabling supplicants to pre-authenticate with access points, or other infrastructure nodes that are on different subnets.

BRIEF SUMMARY OF THE INVENTION

In accordance with an aspect of the present invention, there is described herein a method that makes use of inter-subnet integration at the wireless domain server (WDS) and wireless location register (WLR) service layer to resolve radio MAC addresses that are within a subnet or beyond the subnet.

In accordance with an aspect of the present invention, there is described herein a method for performing pre-authentication. A pre-authentication request is received by a first access point associated with a first subnet from a mobile node requesting pre-authentication with a second access point on a second subnet. The first access point forwards the pre-authentication request to an authenticator for the first subnet. The authenticator for the first subnet obtains the address for the authenticator for the second access point from a root infrastructure node, such as a wireless location register. The authenticator for the first subnet pre-authenticates the mobile node with the authenticator of the second access point.

An aspect of the present invention is a system for performing pre-authentication across different subnets. The system comprises means for receiving a pre-authentication request by a first access point associated with a first subnet from a mobile node requesting pre-authentication with a second access point on a second subnet. The system further comprises means for forwarding the pre-authentication request to a first authenticator, wherein the first authenticator is the authenticator for the first subnet. The system also has means for obtaining from a root infrastructure node, an address for a second authenticator that is the authenticator for the second access point by the first authenticator. The system also includes means for pre-authenticating the mobile node with the second authenticator by the first authenticator, wherein the first authenticator sends a message to the address for the second authenticator.

An aspect of the present invention is a hierarchical network comprising a root infrastructure node, where the root infrastructure node comprises a wireless location register and an associated infrastructure authenticator. An authentication server is coupled to the root infrastructure node via a first communication interface. A first subnet comprising a first wireless domain server is coupled to the root infrastructure node via a second communication interface, where the first wireless domain server being the authenticator for a first subnet. A second subnet comprising a second wireless domain server is coupled to the root infrastructure node via the second communication interface, where the second wireless domain server is the authenticator for the second subnet. A first wireless access point is associated with the first subnet and is communicatively coupled to the first wireless domain server. A second wireless access point is associated with the second subnet and is communicatively coupled to the second wireless domain server. The infrastructure authenticator is responsible for authenticating with the first wireless domain server, the second wireless domain servers, the first access point and the second access point enabling the first wireless domain server, the second wireless domain server, the first access point and the second access to securely communicate with each other. The first wireless access point is responsive to receipt of a pre-authentication request from a mobile node that has already been authenticated by the authentication server attempting to pre-authenticate with the second wireless access point to forward the pre-authentication request to the first wireless domain server. The first wireless domain server is responsive to obtain the address for the second wireless domain server from the wireless location register. The first wireless domain server is further responsive to securely communicate the pre-authentication request to either the wireless location register or directly with the second wireless domain server.

A feature of the present invention is that it provides scalability. The present invention provides the ability to achieve pre-authentication across subnets, enabling larger and more hierarchical networks to be deployed.

Another feature of the present invention is that it provides ease-of-use for mobile clients. Without the ability to perform pre-authentication across subnets, scenarios exist where a user's session does not transfer, and continuous network connectivity is interrupted or dropped.

Still another feature of the present invention is that it provides additional security. By using a trusted system that authenticates all component access points and other infrastructure nodes, the present invention ensures that a user will not inadvertently pre-authenticate to a rogue or invalid AP that is not known to the WDS or WLR system.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Throughout this description, the preferred embodiment and examples shown should be considered as exemplars, rather than limitations, of the present invention. The present invention contemplates the use of a wireless domain server (WDS) and a wireless location register (WLR) to route inter-subnet pre-authentication requests that otherwise would not be routed for an access point.

Figure 1:
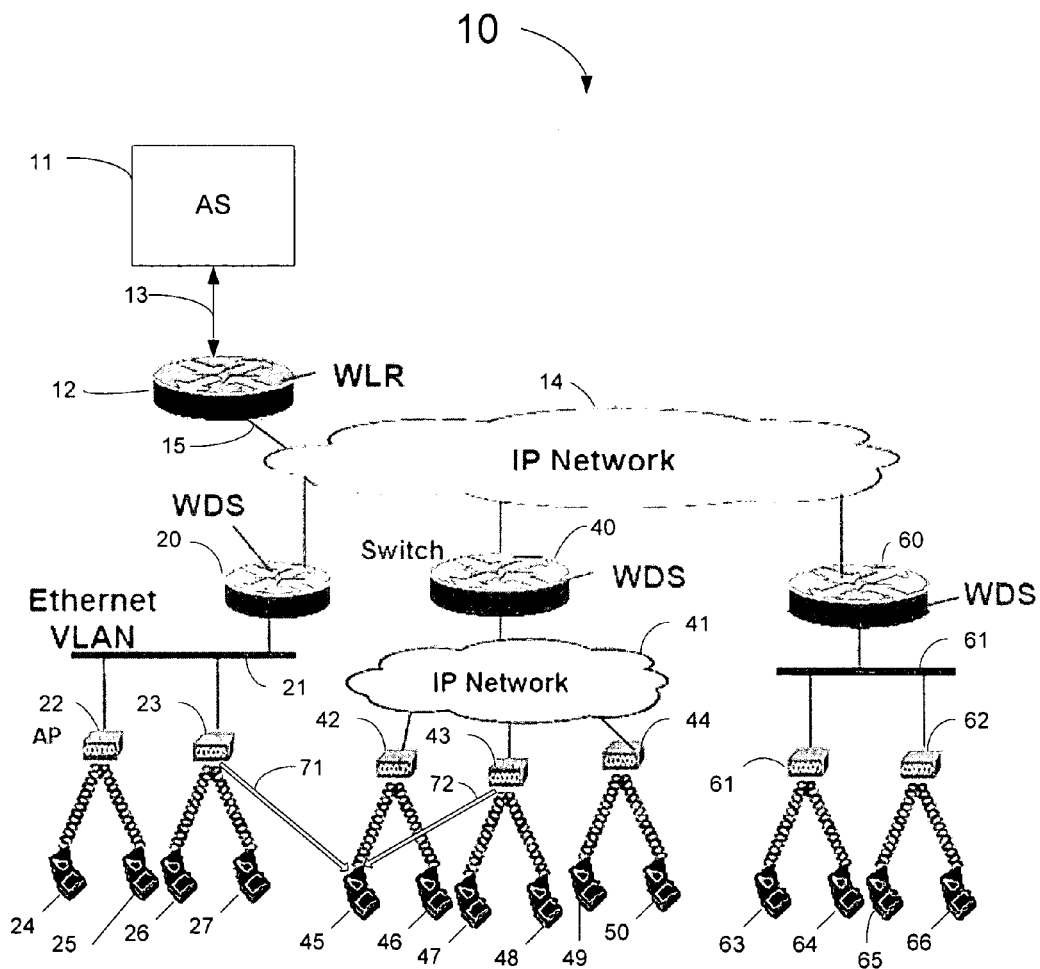
FIG. 1 is a block diagram of a network configured in accordance with an aspect of the present invention.

Referring to FIG. 1, there is a block diagram of a network 10 configured in accordance with an aspect of the present invention. The network 10 is configured with a hierarchical structure.

At the top of the hierarchical structure is a Wireless Location Register (WLR) 12. WLR 12 is the Root Infrastructure Node (IN) of the campus topology tree of network 10. As used herein, an infrastructure node (IN) includes, but is not limited to a switch, router, Work-group Bridge (WGB), repeater AP, root AP, Wireless Domain Server (WDS) or a Wireless Location Register (WLR). Each infrastructure node comprises logic for performing the functions described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. WLR 12 contains an infrastructure authenticator (IA) and a directory of Anchor-WDS/MN (mobile node or STA) bindings (not shown). The IA functions as a Network Access Server (NAS) to establish mutual authentication and a Network Session Key (NSK) with an infrastructure node, via an access server 11, e.g., a RADIUS (Remote Authentication Dial-In User Service—RFC 2865) server that is coupled to WLR 12 via a first communication interface 13. WLR 12 contains the IA for all infrastructure nodes in a hierarchical campus network. All INs within network 10 (e.g., WDSs 20, 40 60 and AP's 22, 23, 42, 43, 44, 61, 62) authenticate and register with the WLR/IA, where "WLR/IA" refers to WLR 12 and the collocated IA. WLR 12 maintains an Infrastructure Node Table (IN Table) with an entry for each WDS 20, 40 60, and in some embodiments of the present invention an entry for each AP 22, 23, 24, 42, 43, 44, 61, 62, and any other infrastructure node within network 10. An entry for an IN contains the IN's Node ID, IP address, authentication state, registration state, and other information.

Furthermore, the WLR/IA also functions as a trusted third party to establish mutual authentication, and a Context Transfer Key (CTK) between any two peer infrastructure nodes. In a preferred embodiment, the Authenticator for an AP is located in the AP's parent WDS. An AP is indirectly registered with WLR 12, via a parent WDS. For example, APs 22 and 23 are registered via WDS 20, APs 42, 43, 44 are registered via WDS 40 and APs 61 and 62 via WDS 60. The CTK enables infrastructure nodes to securely communicate with each other.

Wireless domain servers 20, 40 60, are coupled to WLR 12 via a second communication interface 15 to IP network 14. Although FIG. 1 shows an IP network 14 for coupling WLR 12 to WDS 20, WDS 40 and WDS 60, any suitable wired or wireless network topology can be used. A WDS maintains a registry and caches context information for nodes in its wireless domain. Furthermore, the WDS functions as an 802.1X authenticator for nodes within its wireless domain. Therefore, WDS 20 functions as the 802.1X authenticator for APs 22, 23; Switch 40 functions as the 802.1X authenticator for APs 42,43 and 44; and WDS 60 is the 802.1X authenticator for APs 61 and 62.

As shown in FIG. 1, APs 22 and 23 are coupled to WDS 20 via an Ethernet VLAN 21. APs 42, 43 and 44 are coupled to (Switch) WDS 40 via an IP Network 41. APs 61 and 62 are coupled to WDS 60 via a wired network 61. Those skilled in the art should readily appreciate that the network configuration for networks 21, 41 and 61 are merely illustrative and that any suitable network topology is acceptable and suitably adaptable to the principles of the present invention.

As shown in FIG. 1, mobile nodes 24 and 25 are associated with AP 22 and mobile nodes 26 and 27 to AP 23, and APs 22 and 23 are connected to WDS 20. Mobile nodes 45 and 46 are associated with AP 42, mobiles 47, 48 with AP 43 and mobile nodes 49 and 50 with AP 44, wherein APs 42, 43 and 44 are coupled to Switch 60. Mobile nodes 63 and 64 are associated with AP 61 and mobile nodes 65 and 66 are associated with AP 62.

As shown in FIG. 1, mobile node 45, which is associated with AP 42 is receiving beacon 71 from AP 23 and beacon 72 from AP 43. If mobile node 45 wishes to pre-authenticate with one or both of APs 23 and 43, it sends a pre-authentication request for AP 23 and or AP 43 to AP 42. The pre-authentication request is a special 802.1X request. The request is 'special' because it is not going to the AP with which it is attempting to pre-authenticate (AP 23 and/or 43) directly, but to AP 42 which it is currently associated. The pre-authentication request contains the MAC address(es) of the AP's (e.g., AP 23 and/or 43) the MN wants to pre-authenticate with.

Because AP 43 is on the same subnet as AP 42, AP 42 sends the pre-authentication request via IP network 41 to AP 43. However, in accordance with an aspect of the present invention, to send the pre-authentication request to AP 23 that is on a different subnet, AP 42 forwards the request to its wireless domain server, which in this example is WDS 40. WDS 40 then sends a request to WLR 12 to ascertain the location of AP 23 based on AP 23's MAC address. In one embodiment, WLR 12 maintains a table listing all APs it manages and their corresponding wireless domain server. In another embodiment, WLR 12 sends a message, such as a broadcast message, over IP network 14 requesting the identity of the wireless domain server for AP 23. Either the wireless domain server for AP 23, in this example WDS 20, or any other WDS, such as WDS 60, that knows the identity of the authenticator of AP 23 responds to the message. WLR 12 then informs (switch) WDS 40 the address of the authenticator for AP 23.

In accordance with an aspect of the present invention, security of the network is enhanced by preventing pre-authentication with a rogue AP. If WLR 12 can not determine the identity of the authenticator for the target AP of a pre-authentication request, then it can be assumed that the target AP is a rogue AP. This is because APs belonging to network 10 are authenticated by the WLR/IA and are linked to a corresponding authenticator, such as a WDS or switch. Therefore, a rogue AP would not have been authenticated by the WLR/IA and would be unknown to infrastructure nodes.

After WLR 12 determines the authenticator for AP 23, WDS 40, then forwards the pre-authentication request to the authenticator for AP 23, WDS 20 in this example via IP network 14. Thus, the pre-authentication request is handled WDS to WDS and authenticator to authenticator; in this example, the WDS and authenticator are collocated. In a preferred embodiment, the authenticators use a Context Transfer Key (CTK) to secure communications between them. The communications between authenticators 20, 40 can be either 802.3 packets, and optionally protected by a secure protocol, for example by using a proprietary protocol such as the WLCCP (Wireless LAN Context Control Protocol Specification) used with the System Wide Area Network (SWAN) available from Cisco, Systems, Inc., Cisco Technology, Inc., 170 W. Tasman Drive, San Jose, Calif. 95134. WDS 40 forwards mobile node's 45 authentication context information to WDS 20.

Furthermore, a response to the pre-authentication request to AP 23 is then sent to mobile node 45 by its authenticator, which in this example would be WDS 20. The response could inform mobile 45 whether the pre-authentication was successful, or if the request was denied—for example AP 23 may be busy and unable to accept new associations. WDS 20 would send the response to AP 42 via IP network 41 for routing to MN 45. Thus, in accordance with an aspect of the present invention, MN 45 is able to pre-authenticate with a target AP (AP 23) even though it is not in the same subnet as its currently associated AP (AP 42).

Figure 2:
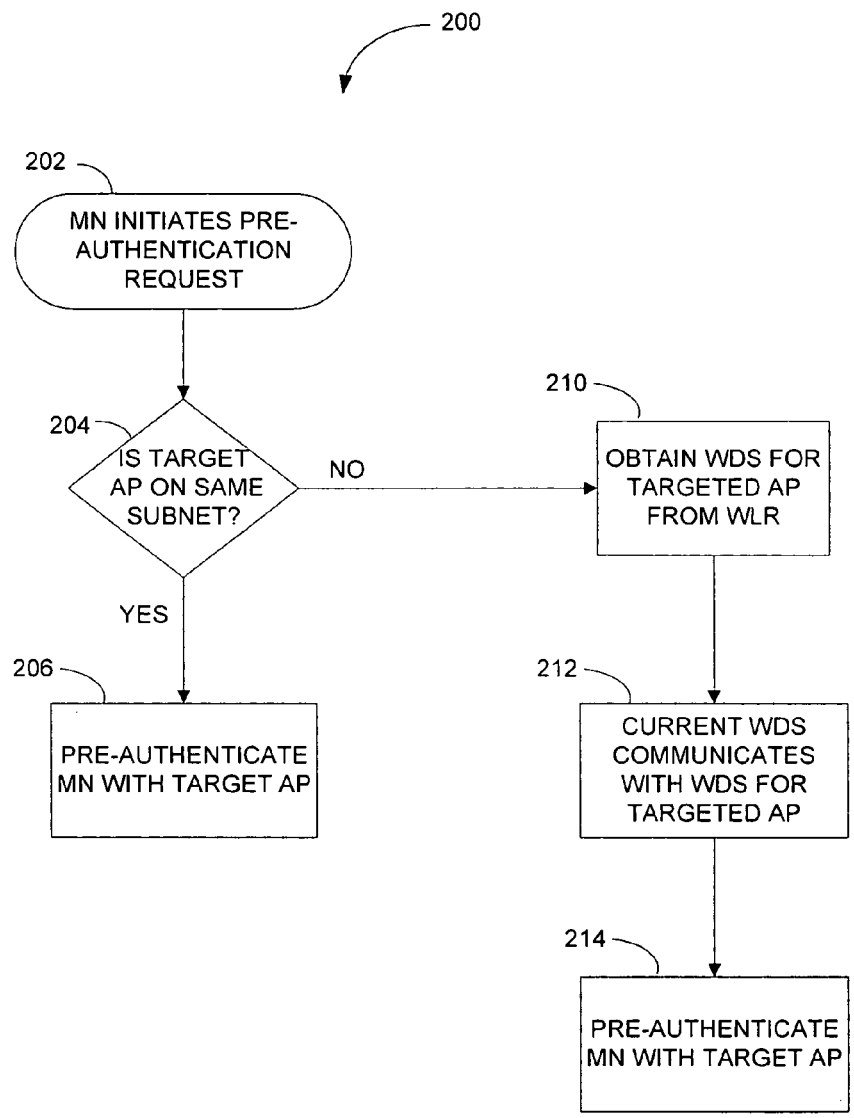
FIG. 2 is a block diagram of a methodology in accordance with an aspect of the present invention.

In view of the foregoing structural and functional features described above, a methodology 200 in accordance with various aspects of the present invention will be better appreciated with reference to FIG. 2. While, for purposes of simplicity of explanation, the methodology of FIG. 2 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

The methodology 200 assumes that the infrastructure nodes have been authenticated by an infrastructure authenticator as described herein supra that is communicatively coupled to the network. At 202, a mobile node (MN) initiates a pre-authentication request. The request would be sent by the MN to an infrastructure node, such as the AP it is currently associated.

At 204, the wireless domain server or authenticator for the currently associated AP determines whether the target AP is on the same subnet. If the target AP is on the same subnet (YES), then at 206, the MN can pre-authenticate with the target AP directly (or using the target AP's authenticator). The pre-authentication can be performed as defined in the 802.11i specification.

If at 204, it is determined that the target AP is not on the same subnet as the currently associated AP, or the authenticator (WDS) for the subnet, then at 210 the address for the authenticator (WDS) for the targeted AP is obtained from the WLR. The WLR can either have a table that stores the links between APs, WDS and authenticators, or can send a message requesting a WDS knowing the location of the target AP provide the identity of the authenticator of the targeted AP. It should be noted that if the WDS sends a message requesting a WDS knowing the location of the target AP to respond, any WDS knowing the location of the target AP can respond, not just the WDS for the target AP. It is implied that the WDS have established a trust relationship prior to these requests either via a WLR or directly between WDSs.

At 212, the authenticator (WDS) for the AP the mobile node is currently associated (associated WDS) communicates with the WLR or authenticator (target WDS) for the targeted AP. The authenticator to authenticator communication enables the associated WDS to provide context information and any other parameters to the target WDS for pre-authentication. In a preferred embodiment, the communication between the associated WDS and targeted WDS is secure, for example establishing an IPSec connection or using a Context Transfer Key (CTK) is used to secure communications between them. The communications between the associated WDS and targeted WDS can use any protocol such as 802.3 packets, or WLCCP messages.

At 214, the 802.1X EAP exchange between the target AP's authenticator and the MN establishes a routing path and secure connection between the MN and the target AP. Once the routing path and secure connection between the associated AP and target AP's authenticator is established, the full 802.1X EAP authentication (e.g. pre-authentication) can be executed between the MN and the target AP (e.g. the target AP's authenticator).

Figure 3:
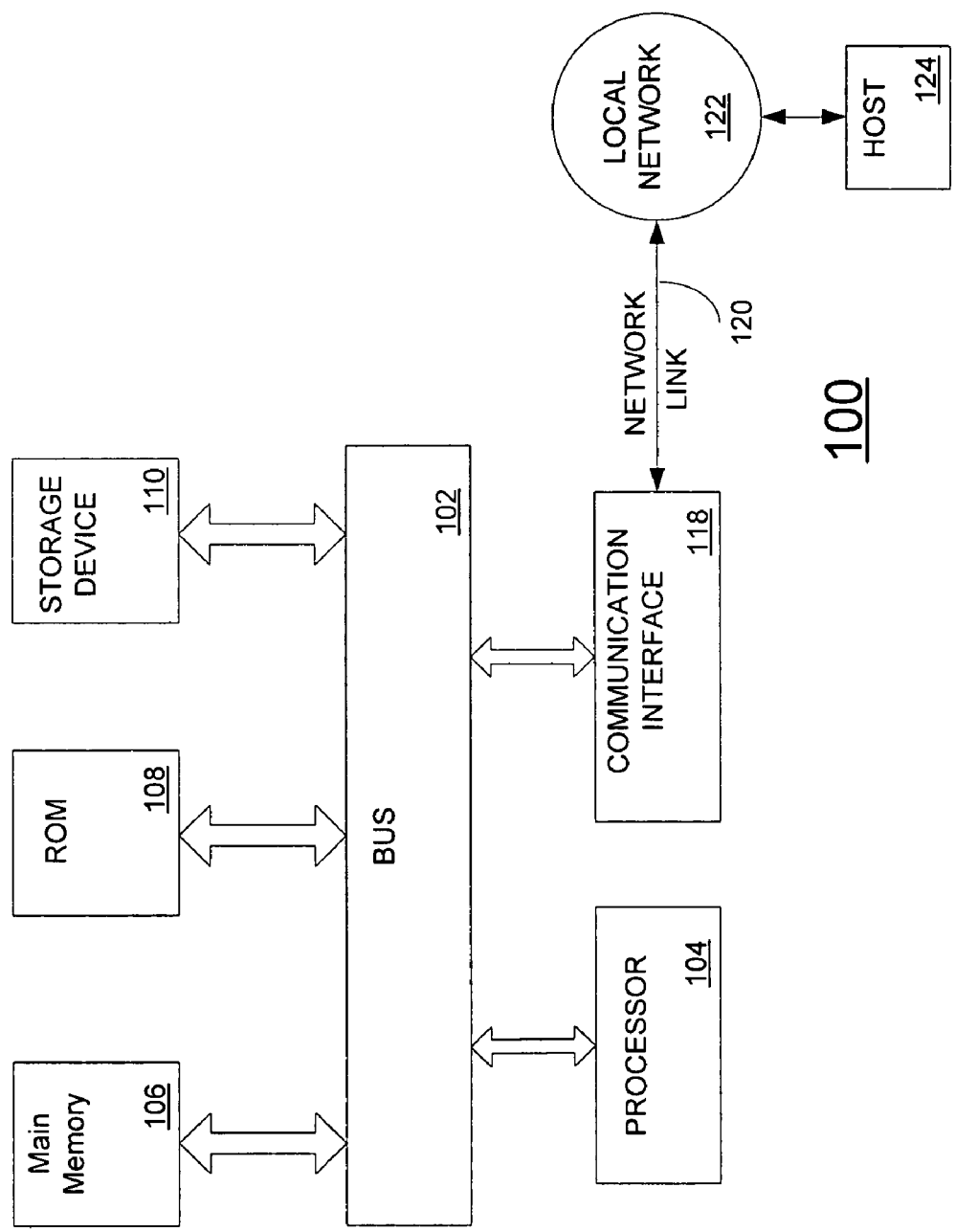
FIG. 3 is a block diagram of a computer system adaptable to be configured in accordance with an aspect of the present invention.

Referring now, to FIG. 3, there is illustrated a computer system 100 upon which an embodiment of the invention may be implemented. Computer system 100 includes a bus 102 or other communication mechanism for communicating information and a processor 104 coupled with bus 102 for processing information. Computer system 100 also includes a main memory 106, such as random access memory (RAM) or other dynamic storage device coupled to bus 102 for storing information and instructions to be executed by processor 104. Main memory 106 also may be used for storing a temporary variable or other intermediate information during execution of instructions to be executed by processor 104. Computer system 100 further includes a ready only memory (ROM) 108 or other static storage device coupled to bus 102 for storing static information and instructions for processor 104. A storage device 110, such as a magnetic disk or optical disk, is provided and coupled to bus 102 for storing information and instructions.

An aspect of the invention is related to the user of computer system 100 within an AP, WDS and/or WLR for performing inter-subnet pre-authentication. According to one embodiment of the invention AP, WDS and/or WLR have a computer system 100 configured perform inter-subnet pre-authentication in response to processor 104 executing one or more sequences of one or more instructions contained in main memory 106. Such instructions may be read into main memory 106 from another computer-readable medium, such as storage device 110. Execution of the sequence of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to non-volatile media, volatile media, and transmission media. Non-volatile media include for example optical or magnetic disks, such as storage device 110. Volatile media include dynamic memory such as main memory 106. Transmission media include coaxial cables, copper wire and fiber optics, including the wires that comprise bus 102. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106 from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic, or optical signals that carry digital data streams representing various types of information.

Network link 120 typically provides data communication through one or more networks to other data devices. For example, network link 120 may provide a connection through local network 122 to other access points, wireless domain servers and/or to a Wireless Location Register. Local network 122 uses electrical, electromagnetic, or optical signals that carry the digital data to and from computer system 100, is an exemplary form of a carrier wave transporting information.

Computer system 100 can send messages and receive data, including program codes, through the network(s), network link 120, and communication interface 118. In accordance with the invention, one such downloaded application provides for inter-subnet pre-authentication as described herein.

The received code may be executed by processor 104 as it is received, and/or stored in storage device 110, or other non-volatile storage for later execution. In this manner, computer system 100 may obtain application code in the form of a carrier wave.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A method for performing inter-subnet pre-authentication, comprising receiving a pre-authentication request by a first access point associated with a first subnet from a mobile node requesting pre-authentication with a second access point on a second subnet;

forwarding the pre-authentication request to a first authenticator, wherein the first authenticator is the authenticator for the first access point;

obtaining from a root infrastructure node, an address for a second authenticator that is the authenticator for the second access point by the first authenticator; and forwarding the pre-authentication request to the second authenticator by the first authenticator; and receiving a response to the authentication request from the second authenticator.

2. The method of claim 1, wherein the root infrastructure node is a wireless location register, the wireless location register comprising an infrastructure authenticator.

3. The method of claim 2, wherein the first authenticator is co-located with a first wireless domain server and the second authenticator is co-located with a second wireless domain server, further comprising:

establishing a trust relation between the first wireless domain server and the second wireless domain server.

4. The method of claim 1, wherein:

the authenticator for the first subnet is co-located with a first wireless domain server; and the authenticator for the second subnet is co-located with a second wireless domain server.

5. The method of claim 1, the pre-authenticating step further comprising forwarding the mobile node's association context information to the second authenticator by the first authenticator.

6. The method of claim 5, the pre-authenticating step further comprising establishing a forwarding path between the mobile node and the second access point.

7. The method of claim 6, the pre-authenticating step further comprising:

wherein the forwarding path is secure.

8. The method of claim 1, the obtaining from a root infrastructure node the address for the second authenticator further comprises looking up the address for the second authenticator using a table associated with the root infrastructure node.

9. The method of claim 1, the obtaining from a root infrastructure node the address for the second authenticator further comprises broadcasting a message requesting the identity of the authenticator for the second access point.

10. The method of claim 1, the pre-authenticating step further comprising the first wireless domain server securely forwarding the mobile node's authentication context information to the second wireless domain server.

11. The method of claim 1, further comprising:
establishing a secure routing path between the first authenticator to the second authenticator to enable the mobile node to pre-authenticate with the second authenticator.

12. A method for performing pre-authentication, comprising:
authenticating a first authenticator for a first subnet by an infrastructure authenticator associated with a wireless location register;
authenticating a second authenticator for a second subnet by the infrastructure authenticator associated with the wireless location register;
authenticating a first access point associated with the first subnet by the infrastructure authenticator associated with the wireless location register, wherein the first authenticator is the authenticator for the first access point;
authenticating a second access point associated with the second subnet by the infrastructure authenticator associated with the wireless location register, wherein the second authenticator is an authenticator for the second access point;
receiving a pre-authentication request by the first access point from a mobile node requesting pre-authentication with the second access point;
forwarding the pre-authentication request to the first authenticator;
obtaining from the wireless location register the address for the authenticator for the second access point by the first authenticator;
forwarding the pre-authentication request to the second authenticator by the first authenticator; and
receiving a response to the authentication request from the second authenticator.

13. The method of claim 12, wherein:
the authenticator for the first subnet is co-located with a first wireless domain server; and
the authenticator for the second subnet is co-located with a second wireless domain server.

14. The method of claim 13, the pre-authenticating step further comprising
securely forwarding the mobile node's association context information to the second authenticator by the first authenticator.

15. The method of claim 12, the pre-authenticating step further comprising:
establishing a forwarding path between the mobile node and the second access point.

16. A system for performing pre-authentication, comprising
means for receiving a pre-authentication request by a first access point associated with a first subnet from a mobile node requesting pre-authentication with a second access point on a second subnet;
means for forwarding the pre-authentication request to a first authenticator, wherein the first authenticator is an authenticator for the first subnet;
means for obtaining from a root infrastructure node, an address for a second authenticator that is an authenticator for the second access point by the first authenticator;
means for forwarding the pre-authentication request to the second authenticator by the first authenticator; and
means for receiving a response to the authentication request from the second authenticator.

17. The system of claim 16, wherein:
the root infrastructure node is a wireless location register, the wireless location register comprising an infrastructure authenticator;
the authenticator for the first subnet is co-located with a first wireless domain server; and
the authenticator for the second subnet is co-located with a second wireless domain server.

18. The system of claim 16, further comprising:
means for authenticating the first authenticator with the root infrastructure node;
means for authenticating the second authenticator with the root infrastructure node;
means for authenticating the first access point with root infrastructure node; and
means for authenticating the second access point associated with the second subnet with the root infrastructure node.

19. The system of claim 16, the means for pre-authenticating further comprising means for forwarding the mobile node's authentication context information to the second authenticator by the first authenticator.

20. The system of claim 19, the means for pre-authenticating further comprising:
means for establishing a secure forwarding path between the mobile node and the second access point.

21. A hierarchical network, comprising:
a root infrastructure node, the root infrastructure node comprising a wireless location register and an associated infrastructure authenticator;
an authentication server coupled to the root infrastructure node via a first communication interface;
a first subnet comprising a first wireless domain server coupled to the root infrastructure node via a second communication interface, the first wireless domain server being co-located with the authenticator for a first subnet;
a second subnet comprising a second wireless domain server coupled to the root infrastructure node via the second communication interface, the second wireless domain server being co-located with the authenticator for the second subnet;
a first wireless access point associated with the first subnet communicatively coupled to the first wireless domain server; and
a second wireless access point associated with the second subnet communicatively coupled to the second wireless domain server;
wherein the infrastructure authenticator is responsive to authenticate the first wireless domain server, the second wireless domain servers, the first access point and the second access point enabling the first wireless domain server, the second wireless domain servers, the first access point and the second access point to securely communicate with each other;

wherein the first wireless access point is responsive to receipt of a pre-authentication request from a mobile node that has been previously authenticated by the authentication server attempting to pre-authenticate with the second wireless access point to forward the pre-authentication request to the first wireless domain server;

wherein the first wireless domain server is responsive to obtain the address for the second wireless domain server from the wireless location register;

wherein the first wireless domain server is responsive to forward the pre-authentication request with the second wireless domain server; and wherein the second wireless domain server is responsive to the request to pre-authenticate the mobile node with the second access point and provide a response to the first wireless domain server.

* * * * *